(12) United States Patent
Takenaka et al.

(10) Patent No.: US 8,205,912 B2
(45) Date of Patent: Jun. 26, 2012

(54) FLUID LINE COUPLING

(75) Inventors: Yasuki Takenaka, Fujisawa (JP);
Mamoru Ogawa, Isehara (JP); Norio Yokoo, Atsugi (JP)

(73) Assignee: A. Raymond et Cie, Grenoble (FR)

( * ) Notice: Subject to any disclaimer, the term of this patent is extended or adjusted under 35 U.S.C. 154(b) by 266 days.

(21) Appl. No.: 12/600,696

(22) PCT Filed: May 9, 2008

(86) PCT No.: PCT/EP2008/003746
§ 371 (c)(1),
(2), (4) Date: Nov. 18, 2009

(87) PCT Pub. No.: WO2009/006962
PCT Pub. Date: Jan. 15, 2009

(65) Prior Publication Data
US 2010/0148491 A1    Jun. 17, 2010

(30) Foreign Application Priority Data

Jul. 11, 2007  (DE) .......................... 10 2007 032 324

(51) Int. Cl.
*F16L 35/00* (2006.01)
(52) U.S. Cl. ........................................ 285/81; 285/319
(58) Field of Classification Search ................ 285/81, 285/82, 91, 305, 319
See application file for complete search history.

(56) References Cited

U.S. PATENT DOCUMENTS

| 4,681,350 | A |   | 7/1987 | Gaita |
| 4,913,467 | A |   | 4/1990 | Washizu |
| 5,226,680 | A |   | 7/1993 | Bahner et al. |
| 5,342,099 | A |   | 8/1994 | Bahner et al. |
| 5,779,279 | A | * | 7/1998 | Bartholomew ................. 285/93 |
| 5,924,746 | A |   | 7/1999 | Fixemer |
| 7,044,506 | B2 | * | 5/2006 | Dong ............................ 285/319 |
| 7,341,282 | B2 | * | 3/2008 | Moretti et al. ................. 285/82 |
| 7,527,303 | B2 | * | 5/2009 | Furuya .......................... 285/305 |
| 7,874,595 | B2 | * | 1/2011 | Lechner et al. ............... 285/305 |

FOREIGN PATENT DOCUMENTS

| DE | 19619026 A1 | 11/1997 |
| FR | 2673699 A1  | 9/1992  |

* cited by examiner

*Primary Examiner* — Aaron Dunwoody
(74) *Attorney, Agent, or Firm* — Faegre Baker Daniels

(57) ABSTRACT

A fluid line coupling includes a receiving part and a locking part connectable to the receiving part. The locking part includes a plurality of elastically resilient spring tongues engageable behind an annular collar formed on a plug-in part that is insertable into the receiving part. A securing part includes a plurality of elongate securing arms. Guide elements are formed on the securing part and the receiving part that are engagable with one another to displace the securing part in relation to the receiving part. In a securing position of the securing part, each securing arm bears against a respective associated spring tongue and prevents the spring tongue from deflecting outwardly. In this manner, the plug-in part is secured by a very high pull-out force against being pulled out of the receiving part.

10 Claims, 4 Drawing Sheets

FLUID LINE COUPLING

CROSS-REFERENCE TO RELATED APPLICATION

This application is a U.S. National Phase Patent Application based on International Application Serial No. PCT/EP2008/003746 filed May 9, 2008, the disclosure of which is hereby explicitly incorporated by reference herein.

BACKGROUND OF THE INVENTION

1. Field of the Invention

The present invention is directed to a fluid line coupling.

2. Description of the Related Art

One known fluid line coupling is disclosed in DE 196 19 026 A1, which has a receiving part and a locking part that is connectable to the receiving part. Formed on the locking part is a number of elastically resilient spring tongues that are adapted to engage behind an annular collar formed on a plug-in part that is to be inserted into the receiving part, so as to hold the plug-in part, in this case, non-releasably in the receiving part.

SUMMARY OF THE INVENTION

The present invention provides a fluid line coupling which, particularly in the case of a releasable connection between the receiving part and the plug-in part, is distinguished by requiring a very high pull-out force to withdraw the plug-in part from the receiving part when the spring tongues are engaged behind the annular collar.

By virtue of the fact that the fluid line coupling according to the invention comprises a securing part which is displaceable in relation to the receiving part, and which, in a securing position involving the cooperation of spring tongues formed on the receiving part and securing arms formed on the securing part, prevents or at least inhibits outward movement of said spring tongues, in the securing position of the securing part the spring tongues cannot move outward without other agency, and remain reliably in the rearwardly engaged position, even under high pull-out forces.

In one form thereof, the present invention provides a fluid line coupling including a receiving part and a locking part, which is connectable to the receiving part and on which is formed a number of elastically resilient spring tongues that are adapted to engage behind an annular collar formed on a plug-in part that is to be inserted into the receiving part, characterized in that also provided is a securing part, on which is formed a number, corresponding to the number of the spring tongues, of elongate securing arms, in that formed on the securing part and on the receiving part are guide means that are in engagement with one another for purposes of displacing the securing part in relation to the receiving part, and in that in a securing position of the securing part, each securing arm bears at the outside against a respective associated spring tongue.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
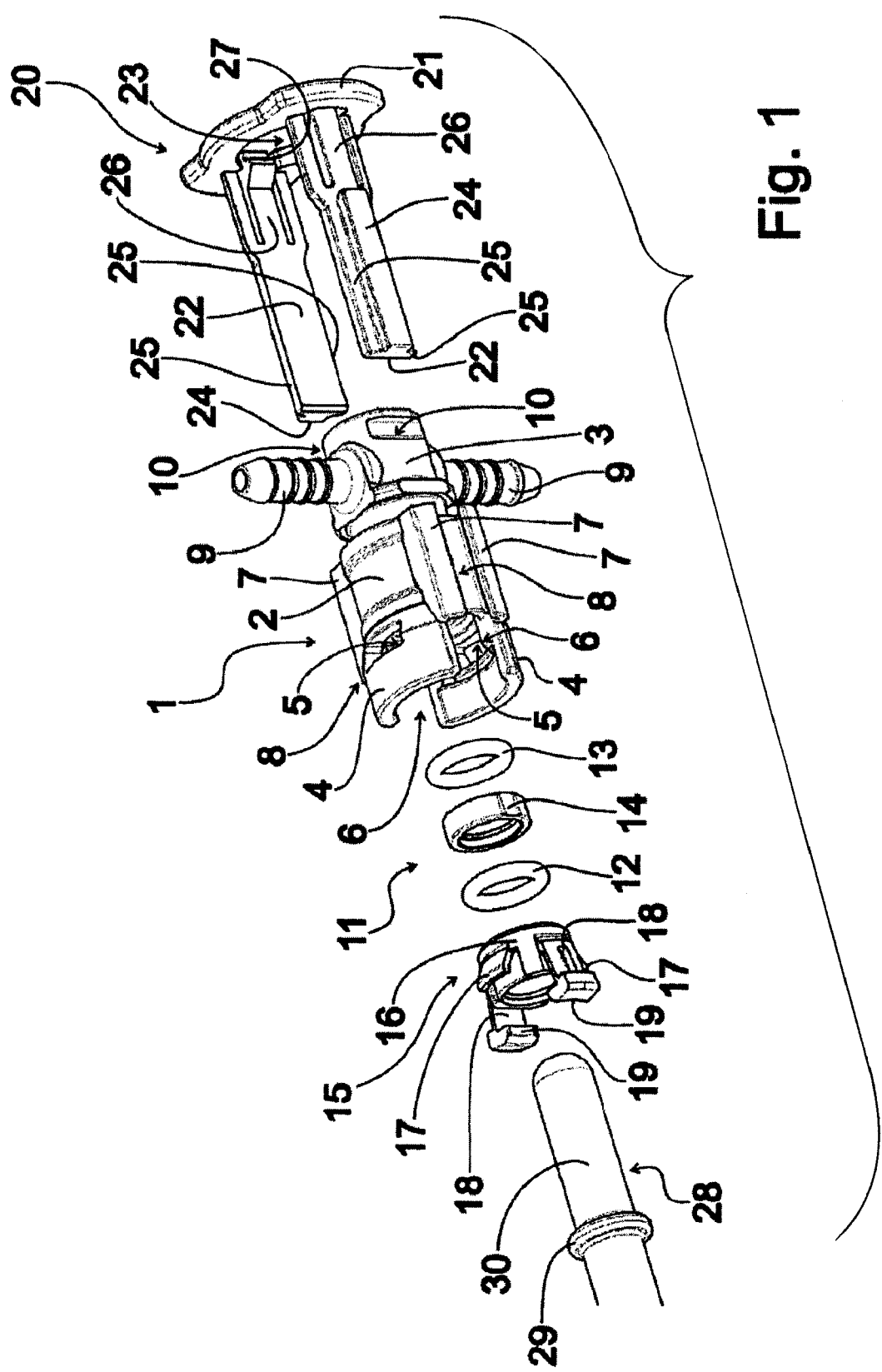
FIG. 1 is an exploded perspective view of an exemplary embodiment of a fluid line coupling according to the invention, comprising a receiving part and a securing part.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DETAILED DESCRIPTION

FIG. 1 is an exploded perspective view of an exemplary embodiment of a fluid line coupling according to the invention, comprising a receiving part 1 made of a hard-elastic synthetic material and having a hollow-cylindrical receiving body 2 and a connecting member 3 adjoined to said receiving body 2.

Formed on receiving body 2 at the end remote from connecting member 3 are two mutually oppositely disposed, shell-shaped end shells 4, which extend away from connecting member 3 in the longitudinal direction of receiving body 2, and each of which has a respective latching tongue receiving clearance 5. Formed between the peripherally confronting edge faces of the end shells 4 in each case is a respective spring tongue receiving space 6, said spring tongue receiving spaces 6 being disposed diametrically opposite each other. In addition, formed on the receiving body 2 in prolongation of each of the two spring tongue receiving spaces 6 in the longitudinal direction is a respective pair of mutually oppositely disposed, elongate edge rails 7 that extend in the longitudinal direction of receiving part 1 and serve as guide means for the receiving part 1, and each of which, by an overhanging portion, covers a surface region of the receiving part 1, and between which is formed a guide bar receiving space 8.

In the exemplary embodiment illustrated in FIG. 1, adjoined to the connecting member 3 are two pipe unions 9, which are mutually aligned and extend in opposite directions, and to which the ends of fluid lines not shown in FIG. 1 can be connected. It can further be seen from FIG. 1 that formed on connecting member 3 in the end region remote from receiving body 2, in prolongation of the spring tongue receiving spaces 6 and of the guide bar receiving spaces 8, are two diametrically oppositely disposed holding slots 10, as holding means for the receiving part 1.

The fluid line coupling in the exemplary embodiment according to FIG. 1 is further provided with a sealing assembly 11, comprising a first soft-elastic sealing ring 12, a second soft-elastic sealing ring 13, and a hard-elastic intermediate ring 14 disposed between sealing rings 12, 13. Sealing rings 12, 13 and intermediate ring 14 are insertable into the receiving body 2.

The fluid line coupling according to the exemplary embodiment of FIG. 1 is further equipped with a locking part 15 made of a hard-elastic synthetic material and having an annular body 16. Formed on the annular body 16 are, on the one hand, two diametrically oppositely disposed latching tongues 17 that are insertable into the latching tongue receiving clearances 5, and, on the other hand, between the latching tongues 17, two also diametrically oppositely disposed spring tongues 18, which are insertable into the spring tongue receiving clearances 6, it being the case that in respective idle position, the latching tongues 17 and the spring tongues 18 extend on one side of the annular body 16 and protrude obliquely radially outward beyond said annular body 16. Formed on the free ends of each spring tongue 18 is a respective radially inwardly projecting locking projection 19.

The fluid line coupling according to the invention further comprises a securing part 20 made of a hard-elastic synthetic material and, in the exemplary embodiment according to FIG. 1, having a flat end plate 21. Formed on the end plate 21 are diametrically oppositely disposed, elongate securing arms 22 that extend in a direction away from the end plate 21. In the described exemplary embodiment, the end plate 21 has a central connecting-member clearance 23 and projects radially beyond the securing arms 22.

Each securing arm 22 is configured outwardly, at its end directed away from end plate 21, with a centrally disposed, raised guide bar 24 and, on each side of each guide bar 24, a respective edge strip 25 that is thinner than the guide bar 24 and serves as a guide means for the securing part 20.

Each securing arm 22 further comprises, on its side facing the end plate 21, a respective resilient holding tongue 26, which extends toward the end plate 21 and each of which has at its free end facing the end plate 21 a respective holding projection 27, each of which extends radially inward toward the other.

Finally, depicted in FIG. 1 is an elongate, substantially cylindrical plug-in part 28, which bears a circumferentially raised annular collar 29 and is to be inserted, by an insertion shaft 30 that is tapered at the end, into the receiving body 2 of the receiving part 1, in order to establish a connection between a fluid line (not shown in FIG. 1) connected to the pipe unions 9 and a fluid line (also not shown in FIG. 1) connected to the plug-in part 28.

Figure 2:
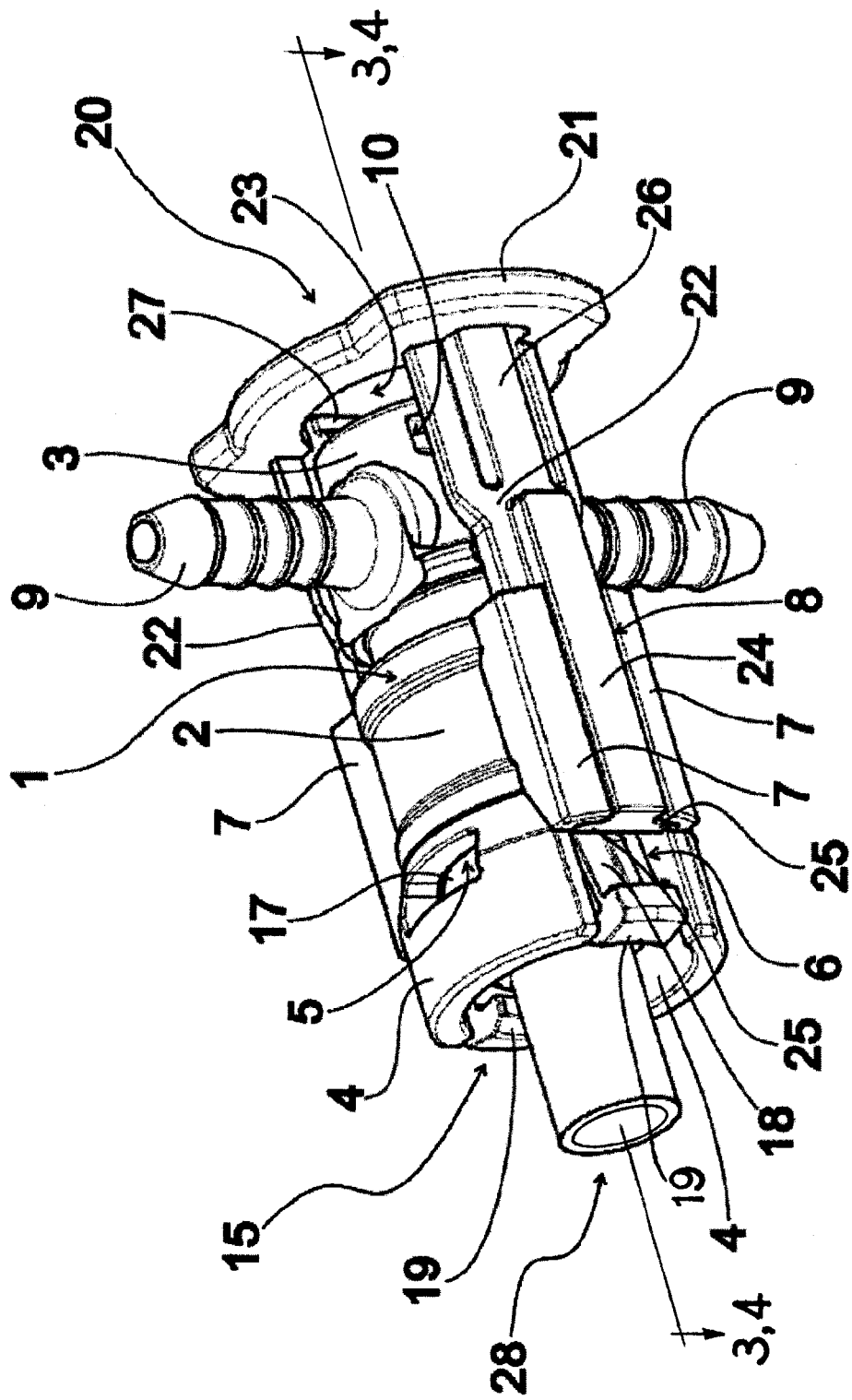
FIG. 2 is a perspective view of the exemplary embodiment according to FIG. 1 with the securing part in a releasing position.

FIG. 2 is a perspective view of the exemplary embodiment according to FIG. 1 in the assembled arrangement of receiving part 1, sealing assembly 11, which in the representation according to FIG. 2 is enclosed by the receiving part 1 and thus cannot be seen, locking part 15 embraced by the end shells 4, securing part 20 pushed onto the receiving part 1, and plug-in part 28 pushed into the receiving part 1, with the securing part in a releasing position in which the securing arms 22 have been pushed so far between the in each case mutually oppositely disposed edge rails 7 that the ends of the securing arms 22 directed away from the end plate 21 are disposed near the spring tongues 18, but insofar as possible without touching them, or, at the very most, pressing them radially inward far enough so that the annular collar 29 can get past the locking projections 19 substantially unhindered. It is further evident from FIG. 2 that the edge strips 25 are covered by the overhanging portions of the edge rails 7 and the guide bars 24 are disposed in the guide bar receiving spaces 8, in order to ensure satisfactory guidance and, in particular, the seating of the securing arms 22 of securing part 20 on the receiving part 1 in a manner that is, in particular, resistant to bending.

Figure 3:
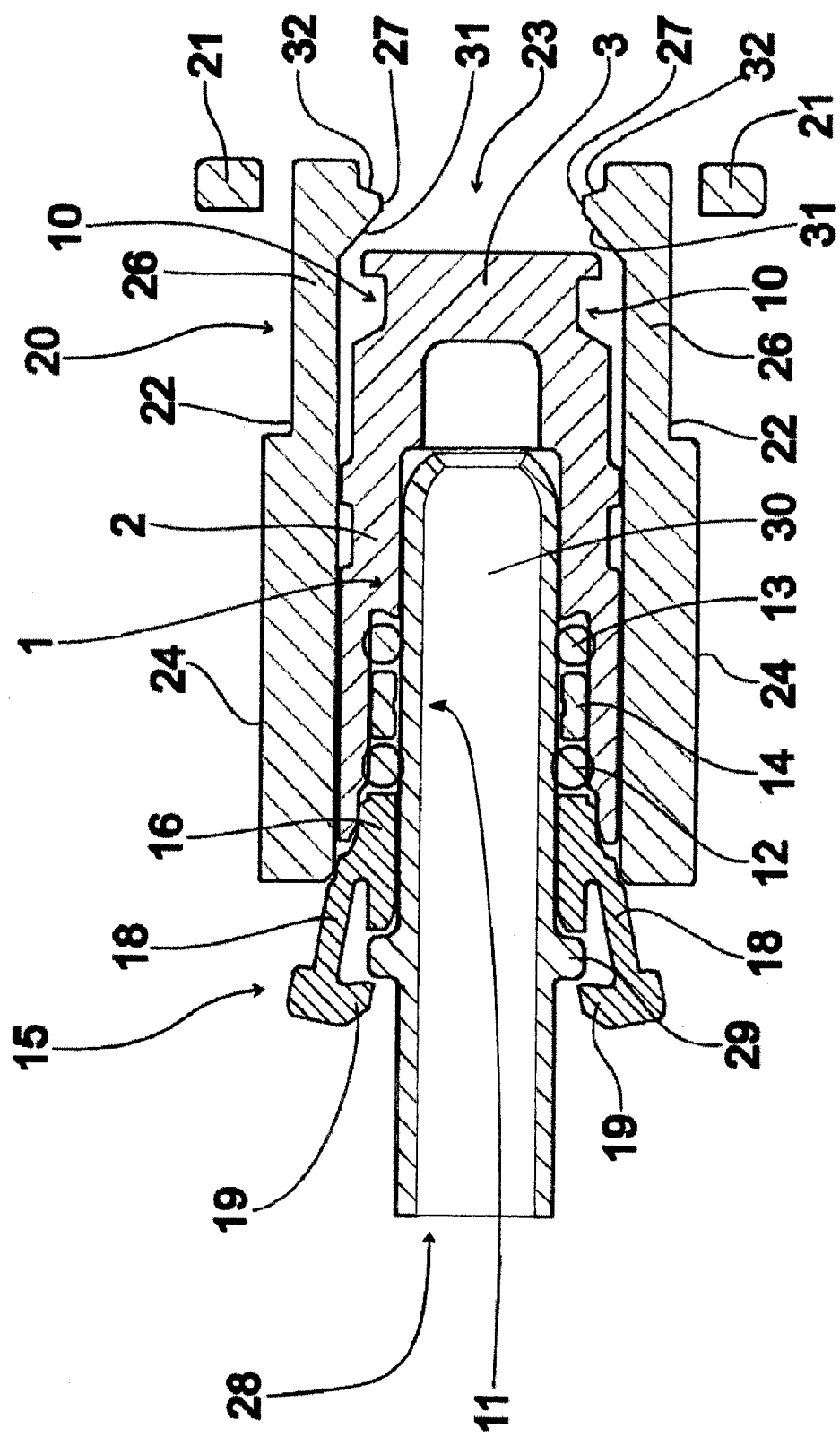
FIG. 3 is a longitudinal section of the exemplary embodiment according to FIG. 1 in the releasing position according to FIG. 2.

FIG. 3 is a longitudinal section of the exemplary embodiment according to FIG. 1 in the releasing position according to FIG. 2. It can be seen from FIG. 3 that the edge rails 7 extend all the way to the locking part 15, and the securing arms 22, in the releasing position, preferably run right up against the spring tongues 18, which are splayed radially obliquely outward in a relaxed, idle position, but without moving them radially inward, such that when the plug-in part 28 is inserted into the receiving part 1, the annular collar 29 can get past the locking projections 19 without contact or at least substantially unhindered.

It can further be appreciated from FIG. 3 that the holding projections 27 each have a relatively shallowly pitched pushing-on flank 31 that is oriented toward the securing arms 22, and a relatively steeply pitched pulling-off flank 32 that is oriented away from the securing arms 22. It is further evident from FIG. 3 that in this exemplary embodiment the holding projections 27, in the releasing position, are disposed a given distance from the connecting member 3, such that the securing part 20 is freely displaceable relative to the receiving part 1 and can be pulled off the receiving part 1 if necessary.

Figure 4:
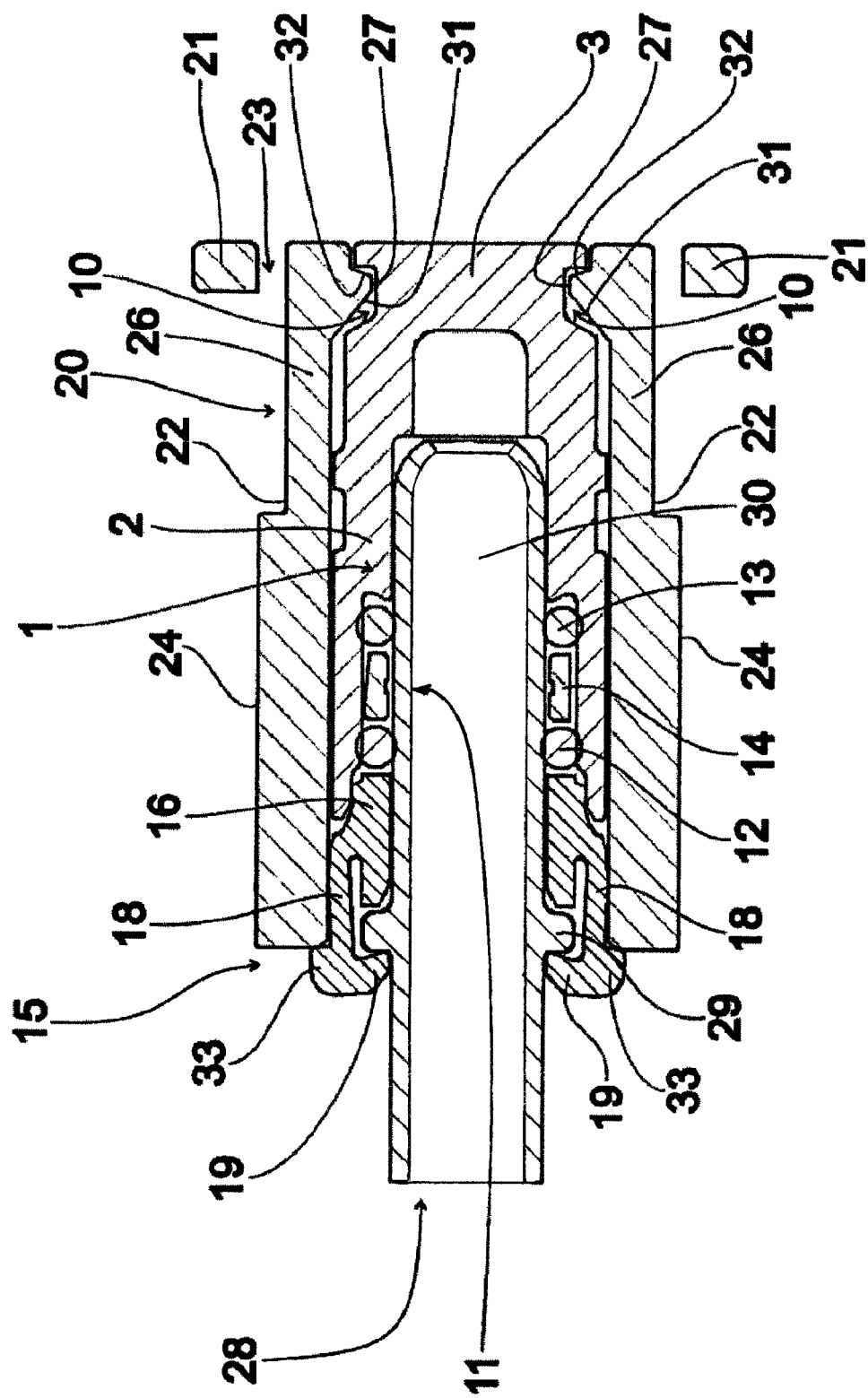
FIG. 4 is a longitudinal section of the exemplary embodiment according to FIG. 1 with the securing part in a securing position.

FIG. 4 is a longitudinal section of the exemplary embodiment according to FIG. 1 with the securing part 20 in a securing position that is pushed forward compared to the releasing position of FIGS. 2 and 3, and in which, by contrast to the releasing position of FIGS. 2 and 3, the securing part 20 has been pushed so far onto the receiving part 1 that the connecting member 3 is disposed in the connecting member clearance 23, and, to obtain high bending stiffness, the securing arms 22 protrude by only a relatively short segment from the far-advanced edge rails 7, and bear against the outer faces of the spring tongues 18 and have pressed them radially inward so far that the locking projections 19 engage behind the annular collar 29 and the radially inward-facing end faces bear against the plug-in part 28. In addition, in the securing position in this exemplary embodiment, the end faces of the ends of the securing arms 22 that are directed away from the end plate 21 bear against terminal bumps 33, serving as stops, which are formed on the free ends of the spring tongues 18 and protrude radially outward beyond the spring tongues 18.

It can further be appreciated from FIG. 4 that during the changeover from the releasing position according to FIGS. 2 and 3 to the securing position according to FIG. 4, after the pushing-on flanks 31 have been made to ride up onto the receiving body 3 by a relatively small expenditure of force, the holding projections 27 are disposed in the holding slots 10, thereby securing the securing part 20 against accidental movement out of the securing position. Only by deliberate action on the end plate 21, with a relatively high expenditure of force in order to overcome a holding resistance presented by the rigid pull-off faces 32, can the securing part 20 be withdrawn from the receiving part 1 in order to re-release the plug-in part 28 after canceling the rearward engagement of the locking projections 19 by deflecting the spring tongues 18 radially outward. The plug-in part 28 thus is secured by a very high pull-out force against being pulled out of the receiving part 1.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A fluid line coupling defining axial and radial directions perpendicular to one another, comprising:
   a receiving part;
   a plug-in part including an annular collar, said plug-in part insertable into said receiving part;
   a locking part connectable to said receiving part and including a plurality of elastically resilient spring tongues, said spring tongues extending along the axial direction and including radially inwardly-projecting locking projections, said locking projections engagable behind said annular collar of said plug-in part;

a securing part including a plurality of elongate securing arms corresponding to said plurality of said spring tongues of said locking part, said securing part movable relative to said receiving part between a releasing position, and a securing position in which each said securing arm bears against a respective associated spring tongue of said locking part; and said securing part and said receiving part each including guide elements, said guide elements of said securing part and said guide elements of said receiving part engageable with one another to displace said securing part in relation to said receiving part.

2. The fluid line coupling of claim 1, wherein said spring tongues, in an idle position corresponding to said releasing position, protrude outwardly to an extent that said annular collar is insertable into said receiving part without contacting said spring tongues and wherein, in said securing position, said securing arms hold said spring tongues in a rearwardly engaged position behind said annular collar of said plug-in part.

3. The fluid line coupling of claim 1, wherein said locking part is non-releasably connected to said receiving part via latching tongues which engage within latching tongue receiving clearances formed in said receiving part.

4. The fluid line coupling of claim 1, wherein said guide elements of said receiving part are edge rails disposed opposite each other in pairs, said edge rails including portions overhanging a surface region of said receiving part, and said guide elements of said securing part are raised guide bars formed outwardly on said securing arms and edge strips disposed one on each side of said guide bars and, in said securing position, said guide bars are disposed between mutually opposite edge rails and said edge strips are covered by said overhanging portions of said edge rails.

5. The fluid line coupling of claim 1, wherein said securing part and said receiving part include holding elements which, in said securing position, are in engagement with one another and hold said securing part in said securing position with a holding resistance.

6. The fluid line coupling of claim 5, wherein said holding elements of said securing part are resilient holding tongues, each including a respective endwise, inwardly-directed holding projection, and said holding elements of said receiving part are provided with at least one holding slot in which said holding projections engage in said securing position.

7. The fluid line coupling of claim 1, wherein said securing arms are formed on an end plate, said end plate including portions that protrude marginally beyond said securing arms.

8. The fluid line coupling of claim 1, wherein said receiving part includes at least one pipe union extending therefrom in a direction perpendicular to said axial direction.

9. The fluid line coupling of claim 8, wherein said receiving part includes a pair of said pipe unions extending therefrom in opposite directions each perpendicular to said axial direction.

10. The fluid line coupling of claim 6, wherein said securing part includes an end plate, said holding tongues extending along the axial direction toward said end plate and each said holding tongue including a free end facing said end plate.

\* \* \* \* \*